Aug. 25, 1959 T. G. COX 2,901,087
METHOD OF AND APPARATUS FOR POSITIONING FRUIT
Original Filed Nov. 1, 1954 2 Sheets-Sheet 1
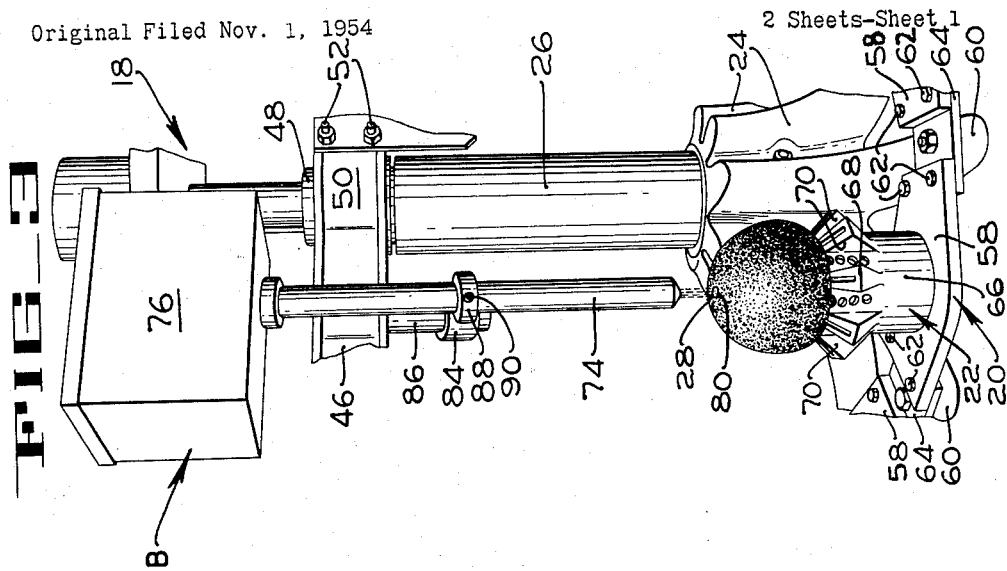
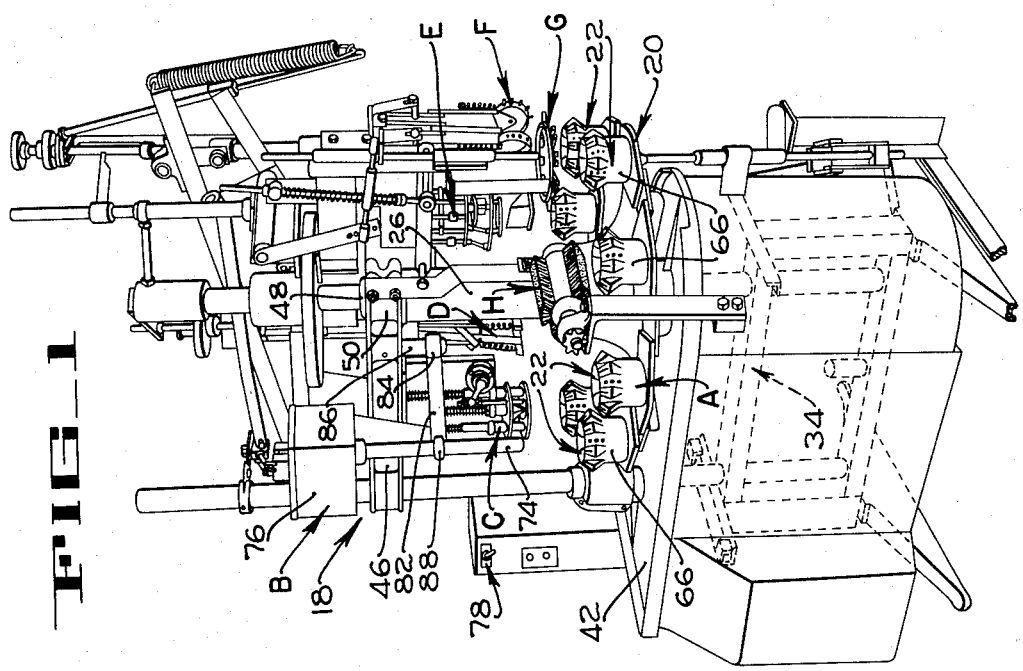
INVENTOR
THOMAS G. COX
BY Hans G. Hoffmeister
ATTORNEY Aug. 25, 1959 T. G. COX 2,901,087
METHOD OF AND APPARATUS FOR POSITIONING FRUIT
Original Filed Nov. 1, 1954 2 Sheets-Sheet 2
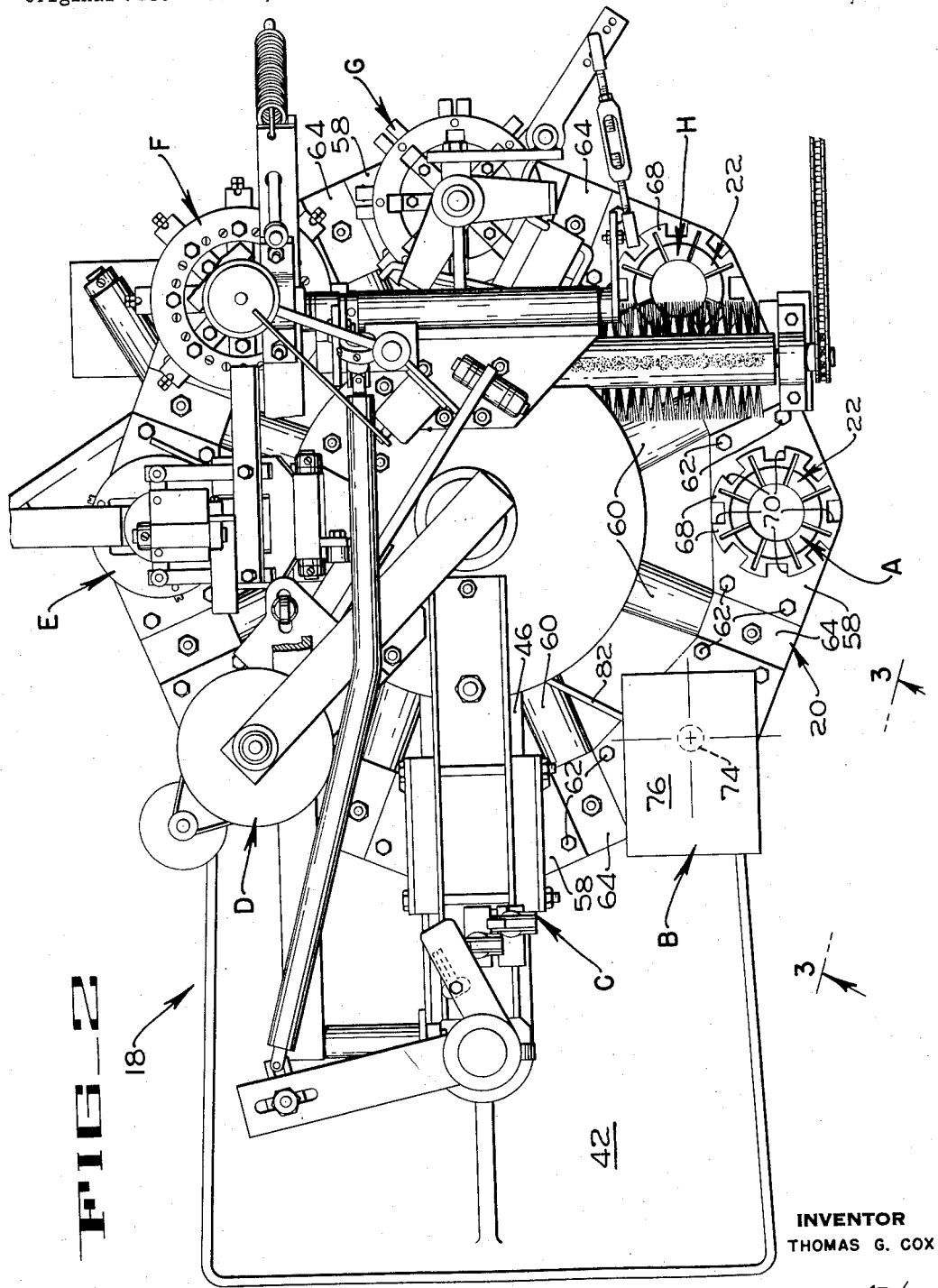
INVENTOR
THOMAS G. COX
BY *Hans G. Hoffmeister*
ATTORNEY United States Patent Office 2,901,087
Patented Aug. 25, 1959

2,901,087

METHOD OF AND APPARATUS FOR POSITIONING FRUIT

Thomas G. Cox, Lakeland, Fla., assignor to Food Machinery and Chemical Corporation, San Jose, Calif., a corporation of Delaware Original application November 1, 1954, Serial No. 466,104. Divided and this application December 20, 1956, Serial No. 629,703

13 Claims. (Cl. 198—33)

The present application is a division of the copending joint U.S. application of Ralph Polk, Jr., Wilber C. Belk and Thomas G. Cox, Serial No. 466,104, filed November 1, 1954.

The present invention pertains to methods and apparatus for handling articles, and more particularly relates to an improved method and apparatus of orienting an article to dispose its axis in a predetermined position.

While the method and apparatus of the present invention may be used in the orientation of a variety of articles, they are particularly effective in handling grapefruit. Accordingly, in the following specification and the accompanying drawings, the present apparatus will be described and illustrated as it is employed in a grapefruit handling machine.

One object of the present invention is to provide an efficient method of orienting an article, at least a part of which is circular, so as to dispose the article in a position wherein an axis which passes through the center of the circular portion of the article extends in a predetermined direction.

Another object of this invention is to provide means for assisting an operator in the orientation of an article to dispose it in a position wherein a particular axis of the article extends in a predetermined direction.

Another object is to provide an efficient apparatus that facilitates the orientation of articles in accordance with the method of the present invention.

Other and further objects and advantages of the present invention will become apparent from the following description taken in connection with the accompanying drawings, wherein:

Fig. 1 is a perspective view of a grapefruit peeling machine having the orienting apparatus of the present invention incorporated therein.

Fig. 2 is an enlarged plan of the grapefruit peeling machine of Fig. 1, certain parts thereof being broken away.

Fig. 3 is an enlarged fragmentary perspective of the mechanism at the grapefruit aligning station, viewed in the direction of arrows 3—3 of Fig. 2.

Before entering into a description of the illustrated embodiment of the present invention, the following brief description will assist in understanding the general arrangement and operation of the machine with which the apparatus of the present invention is employed. For a more complete understanding of the machine with which the illustrated embodiment of the invention is employed, reference may be had to the above-identified copending application.

In Figs. 1, 2 and 3, the reference numeral 18 indicates a grapefruit peeling machine having a turret 20 with eight equally spaced fruit-supporting cups 22 mounted thereon. The turret 20 has a central hub portion 24 (Fig. 3) keyed to a tubular shaft 26 which is arranged to be intermittently rotated about its axis in one-eighth of a revolution increments to move the cups in a clockwise direction (Fig. 2) from a position at a fruit-receiving station A, through successive fruit processing stations B, C, D, E, F, and G, to station H, where the peel, from which the body portion of the grapefruit has been removed, is discharged from the cup.

At station A (Figs. 1 and 2), a grapefruit is deposited either manually or automatically, in a cup 22 so constructed that the grapefruit gravitates to a centered position therein. When the cup is positioned at station B (Figs. 1 and 3), the centered grapefruit is turned manually by an operator so that the stem-blossom axis of the fruit is vertical with the stem end 28 of the grapefruit uppermost. Thus, the grapefruit is disposed with its stem-blossom axis coinciding with the axis of the cup 22. At station C (Fig. 1), the stem end of the fruit is split into eight equal segments of 45° each, preparatory to movement of the grapefruit to the various stations D, E, F, G and H in succession to complete the peeling operation.

The machine 18 is supported by a suitable frame 34 (Fig. 1) and includes a table top 42 mounted in fixed position above the frame 34. A beam 46 (Fig. 1) is mounted in spaced relation above the table top 42 by rigid attachment to the upper end of a support tube 48. The beam 46 has an adjustable clamping end 50 (Fig. 3) which is secured to the support tube 48 by bolts 52. The support tube 48 extends downwardly through the tubular shaft 26 by which the turret 20 is driven, through the table top 42 and is secured at its lower end to the frame 34.

During fruit processing, when a cup 22 of the machine comes to rest at station A (Figs. 1 and 3), a grapefruit is placed in the cup manually or by means of an automatic feeding mechanism (not shown). Each cup 22 (Figs. 2 and 3) comprises a flat base plate 58 which spans the opening between the outer ends of radial arms 60 of the turret 20, each side edge of the plate 58 being secured by bolts 62 to a mounting plate 64 that is rigidly secured on the end of one of the arms 60. The cup 22 has a generally cylindrical body portion 66 (Figs. 1 and 3) integrally formed with the base plate 58 and projecting upwardly therefrom with the axis of the cylinder vertical. An annular lip 68, formed at the upper edge of the body portion 66, is provided with a plurality of equally spaced notches or recesses 70 along its outer surface. The inner surface of the lip 68 is of generally frusto-conical configuration to provide a socket the axis of which coincides with that of the body portion 66, with the result that a grapefruit in an off-center position within the cup 22 will gravitate to a position wherein the center of the grapefruit lies within the vertical axis of the cup.

During operation of the machine, when a cup 22 comes to rest at station B the vertical axis of the cup is automatically aligned with the axis of a vertical light tube 74 which extends downwardly from a ventilated box 76 in which a lamp (not shown) is mounted. In order to illuminate the lamp to permit use of a light beam projected from the tube 74 as an aid in orienting the fruit, the operator manually closes a toggle switch 78 (Fig. 1) to energize a circuit (not shown) including the previously mentioned lamp in the box 76 above station B. The light tube 74 has a central opening in its lower end through which a beam of light is projected downwardly, to impinge upon the grapefruit. The beam forms a spot of light 80 approximately one quarter of an inch in diameter on the grapefruit in the cup and provides reference means to aid in orienting the fruit.

Grapefruit is but one type of fruit that have a surface mark at the stem end and one at the blossom end defining the stem-blossom axis of the fruit. Either of these surface marks may be used to locate the stem-blossom axis of the fruit. The accurate orientation of the fruit so that this axis extends in a particular direction is commonly performed as a preliminary step in the processing of many types of fruit.

At Station B, the operator manually moves the grapefruit while it is centered in a cup 22 until the button or surface mark on the stem end 28 of the grapefruit is centered with relation to the spot 80 provided by the beam of light impinging upon the fruit. The grapefruit is then not only centered in the cup, but is disposed with its stem-blossom axis in alignment with the vertical axis of the cup. The box 76 is supported by the tube 74, and the tube 74 is in turn supported by an arm 82 which has, at one end, a collar 84 (Fig. 3) secured to a bar 86 depending from the beam 46 of the support structure. At its other end, the support arm 82 has a collar 88 which encircles the light tube 74 and is secured thereto by a setscrew 90.

The arm 82 is of such length, and can be adjusted about the vertical axis of the bar 86 to such position that when the lamp within the box 76 is lighted, a concentrated beam of light is projected vertically downward from the tube 74 with its axis coinciding with that of a cup 22 at the station B.

In the operation of the machine 18, a grapefruit is first placed in an empty cup 22 (Figs. 1 and 2) while the cup is at station A. The inclined inner surface of the lip 68 of the cup centers the fruit in the cup, so that the axis of the cup acts as a reference axis for the centering operation. The turret is then advanced one increment to bring the grapefruit to station B (Figs. 1 and 3) where the cup 22 comes to rest in axial alignment with a second reference axis provided by the beam projected downwardly from the vertical light tube 74. The operator manually turns the grapefruit while it is supported upon the upper end of the cup, to center the previously described button or surface mark at the stem end of the grapefruit with relation to the spot of light projected onto the surface of the fruit. When the button is centered with the light spot, the stem-blossom axis of the grapefruit coincides with the vertical axis of the cup, and consequently the grapefruit is properly oriented for the performance of the next step of the peeling operation when the turret is again advanced to position the cup 22 at station C (Fig. 1).

From the foregoing description, it will be recognized that the present invention provides a novel and efficient method of and apparatus for orienting an article which has a circular portion, to dispose the same with the axis of the article that is defined by the center of the circular portion of the article and an axis-indicating mark on the surface of the article, in a predetermined position.

It will be understood that modifications and variations may be made in the method of the present invention and in the structure of the illustrated apparatus without departing from the scope of the present invention.

Having thus described my invention, what I believe is new and desire to protect by Letters Patent is:

1. Apparatus for orienting an article having a mark on its surface at the point where a certain axis of the article intersects the surface of the article, comprising means for supporting the article with the center of the article lying within a predetermined axis, and means for projecing a spot of light onto the surface of the article with the center of the light spot lying within said predetermined axis to provide a reference with which the surface mark on the article can be centered to attain coincidence of said axes.

2. Apparatus for orienting an article having a mark on its surface at the point where a certain axis of the article intersects the surface of the article, comprising means for supporting the article with the center of the article lying within a predetermined axis, and means for projecting a beam of light toward the article with the axis of the beam coinciding with said predetermined axis to form on the surface of the article a spot of light that is centered with relation to the predetermined axis.

3. In a machine for handling grapefruit or the like, a support member having a circular opening defining a support surface adapted to receive and center a grapefruit therein, and a light projector mounted adjacent said support member and arranged to project a light beam through the center of said circular opening.

4. In a machine for handling grapefruit or similar fruit which have surface marks thereon locating their stem-blossom axes, an upright cup arranged to receive and center a grapefruit therein, and a light projector mounted in axial alignment with the cup and arranged to project a light beam along the axis of the cup to illuminate on the surface of the fruit a spot through the center of which the axis of the cup extends whereby the stem-blossom axis of the fruit can be aligned with the axis of the cup by turning the fruit until the mark on the surface thereof is centered with the illuminated spot.

5. In a machine for handling grapefruit or similar fruit which have surface marks thereon locating their stem-blossom axes, an upright cup disposed with its axis extending vertically, said cup being arranged to receive and center a grapefruit therein, means mounting said cup for movement along a horizontal path, means operable to position said cup mounting means at a predetermined station, and a light projector mounted above said cup at said station and arranged to project a beam of light toward said cup in alignment with the axis thereof to form a light spot on the surface of the fruit through which the axis of the cup extends whereby the stem-blossom axis of the fruit is aligned with the axis of the cup by centering the surface mark of the fruit with relation to the illuminated spot.

6. In a machine for handling grapefruit or similar fruit which have surface marks thereon locating their stem-blossom axes, a fruit support member having a circular opening, inclined guide surfaces on said support member adjacent said opening adapted to receive and center a fruit with relation to said opening, means operable to advance said fruit support member along a predetermined path and to position said member at a particular location in said path, and a light projector constructed and arranged to project a beam of light toward said support member in axial alignment with said circular opening therein when said fruit support member is positioned at said particular location to provide a reference axis to which the surface mark is moved in orienting the fruit.

7. In a machine for handling a grapefruit having thereon a surface mark intersected by its stem-blossom axis, a grapefruit support member having a circular opening therein, inclined guide surfaces on said support member adjacent said opening adapted to receive and center the grapefruit with relation to said opening, means operable to advance said support member along a circular path and to position said member at a particular location in said path, and a light projector mounted above said support member in axial alignment with said circular opening and arranged to project a beam of light toward said support member when said grapefruit support member is positioned at said particular location whereby a reference axis is provided to which the surface mark is moved in orienting the grapefruit.

8. In a machine for handling a fruit having thereon a surface mark intersected by the stem-blossom axis thereof, a fruit support member having a circular opening therein, inclined guide surfaces on said support member around said opening adapted to receive a fruit and center the same with relation to said opening, means operable to move said fruit support member along a predetermined path and to position said member at a particular location in said path, a light projector arranged to project a beam of light toward said fruit support, and means adjustably mounting said projector whereby said projector may be brought into a desired relation to said fruit support member with the axis of the beam of light coinciding with the axis of said circular opening when said support member is positioned at said particular location.

9. In a method of orienting a fruit having an axis-indictating mark on the surface thereof, the steps of adjusting the fruit laterally to center the same with relation to a reference axis, directing a light beam along the reference axis to impinge on the surface of the fruit, and shifting the fruit while in centered position to center the surface mark with relation to the beam.

10. In a method of orienting a grapefruit having a surface mark thereon at the point where the stem-blossom axis of the fruit intersects the surface of the fruit, the steps of supporting the grapefruit in centered relationship with a reference axis, advancing the grapefruit while so supported to a particular location, directing a beam of light along the axis toward the grapefruit while at said particular location, and moving the grapefruit on its convex surface while so supported and centered to center the mark on the surface of the grapefruit with relation to the light-beam to dispose the grapefruit in a position wherein its stem-blossom axis coincides with the axis of the light beam.

11. A method of orienting a fruit having a mark on the surface thereof at the point where a certain axis of the fruit intersects the surface of the fruit, comprising the steps of placing the fruit on a support, centering the fruit with relation to a reference axis in fixed position with relation to the support, aiming a light beam at the fruit to illuminate on the surface of the fruit an area centered with relation to said reference axis, and turning the fruit on the support to center said mark on the surface thereof with relation to the illuminated spot to dispose said axis of the fruit in predetermined relationship with said reference axis.

12. In a machine for handling a fruit having thereon a surface mark intersected by the stem-blossom axis thereof, a fruit support member having a circular opening therein, inclined guide surfaces on said support member around said opening adapted to receive a fruit and center the same with relation to said opening, means operable to move said fruit support member along a predetermined path and to position said member at a particular location in said path, a light projector arranged to project a beam of light toward said fruit support member, and means adjustably mounting said projector whereby said projector may be brought into a desired relation to said fruit support member with the axis of the beam of light intersecting the center of said circular opening when said support member is positioned at said particular location.

13. In a machine for handling fruit having a surface mark intersected by the stem-blossom axis of the fruit, a light source arranged to project a beam of light, and fruit support means mounted adjacent said light source and arranged to support a fruit with its center in the beam, said beam establishing a visible reference axis with which the stem-blossom axis of the fruit is in alignment when said beam and said surface mark coincide.

References Cited in the file of this patent
UNITED STATES PATENTS

| | | |
|---|---|---|
| 1,995,694 | Urschel | Mar. 26, 1935 |
| 2,225,979 | Carroll | Dec. 24, 1940 |
| 2,572,773 | Slagle | Oct. 23, 1951 |
| 2,649,880 | Ewald | Aug. 25, 1953 |